(12) United States Patent
Kortti et al.

(10) Patent No.: US 9,639,456 B2
(45) Date of Patent: May 2, 2017

(54) NETWORK-BASED TESTING SERVICE AND METHOD OF TESTING IN A NETWORK

(71) Applicant: CODENOMICON OY, Oulu (FI)

(72) Inventors: Heikki Kortti, Helsinki (FI); Rauli Kaksonen, Rovaniemi (FI)

(73) Assignee: SYNOPSYS, INC., Mountain View, CA (US)

( * ) Notice: Subject to any disclaimer, the term of this patent is extended or adjusted under 35 U.S.C. 154(b) by 144 days.

(21) Appl. No.: 14/365,128

(22) PCT Filed: Dec. 4, 2012

(86) PCT No.: PCT/FI2012/051206
§ 371 (c)(1),
(2) Date: Jun. 13, 2014

(87) PCT Pub. No.: WO2013/087982
PCT Pub. Date: Jun. 20, 2013

(65) Prior Publication Data
US 2015/0058680 A1    Feb. 26, 2015

(30) Foreign Application Priority Data
Dec. 16, 2011  (FI) .................................... 20116278

(51) Int. Cl.
*G06F 11/00*  (2006.01)
*G06F 11/36*  (2006.01)

(52) U.S. Cl.
CPC ........ *G06F 11/3692* (2013.01); *G06F 11/368* (2013.01); *G06F 11/3684* (2013.01); *G06F 11/3688* (2013.01)

(58) Field of Classification Search
CPC ............... G06F 11/3692; G06F 11/368; G06F 11/3684; G06F 11/3688
See application file for complete search history.

(56) References Cited

U.S. PATENT DOCUMENTS 6,182,245 B1 *  1/2001  Akin ................... G06F 11/3672
                                               711/100
6,286,131 B1 *  9/2001  Beers ................. G06F 11/3688
                                               703/22

(Continued)

FOREIGN PATENT DOCUMENTS

WO        2007070414        6/2007
WO   WO 2007070414 A2 *   6/2007   .......... G06F 11/3688

OTHER PUBLICATIONS

International Search Report dated Apr. 16, 2013, corresponding to PCT/FI2012/051206.

(Continued)

*Primary Examiner* — Michael Maskulinski
*Assistant Examiner* — Anthony J Amoroso
(74) *Attorney, Agent, or Firm* — Young & Thompson

(57) ABSTRACT

A network-based testing method and service integrated with a tool that publishes one or more tagged test cases with tags being executable to reproduce a sequence of events for a system under test, SUT, caused by an original test case. The method is performed in a network and is intended for testing software or hardware by first creating an original test case for a system under test, SUT, and performing a sequence of events for the original test case for testing it. The tested case is stored and information of the performed sequence of events is tagged to the tested case. The tagged test case is then sent to a service that publishes tagged test cases. The service publishes the tagged case in a way to be reproduced via the service.

25 Claims, 4 Drawing Sheets

(56) References Cited

U.S. PATENT DOCUMENTS

Figure 1:
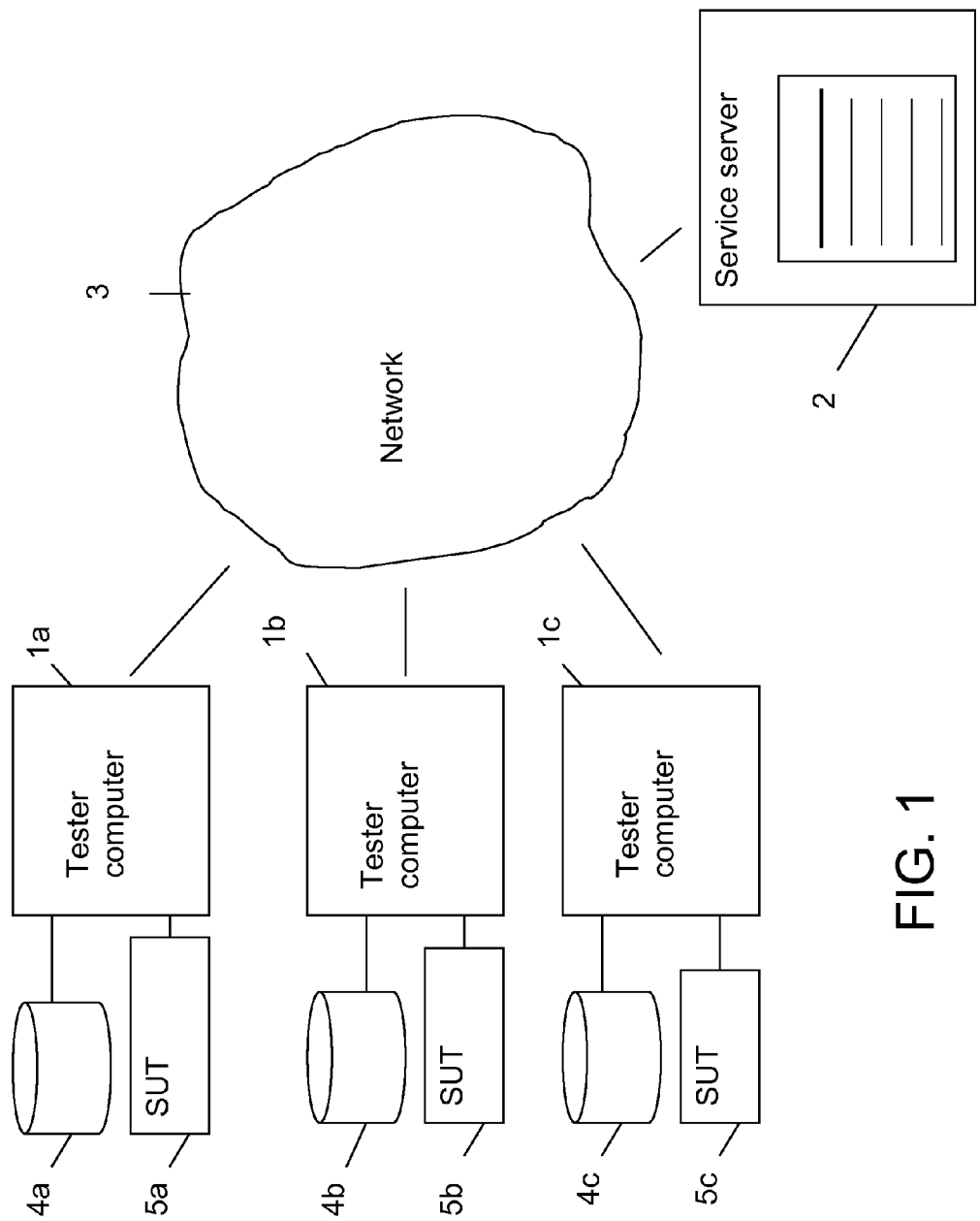

| | | | |
|---|---|---|---|
| 6,442,714 B1* | 8/2002 | Griffin | G06F 11/2294 434/350 |
| 6,957,366 B1 | 10/2005 | McDonald | |
| 2005/0229159 A1* | 10/2005 | Haba | G06F 11/368 717/122 |
| 2006/0212540 A1 | 9/2006 | Chon et al. | |
| 2006/0230384 A1 | 10/2006 | Potts et al. | |
| 2007/0250521 A1 | 10/2007 | Kaminski, Jr. | |
| 2009/0204848 A1* | 8/2009 | Kube | G05B 23/0278 714/25 |
| 2011/0077959 A1 | 3/2011 | Klein | |
| 2012/0173931 A1* | 7/2012 | Kube | G05B 23/0256 714/37 |

OTHER PUBLICATIONS

Finnish Search Report dated Jul. 5, 2012, corresponding to the Priority Application No. 20116278.
FI search report, dated Jan. 21, 2015: Application No. 20116278.
"Shared Resource," retrieved from the Internet: https://en.wikipedia.org/w/index.php?title=Shared_resource&oldid=465735922.

* cited by examiner

| TAG DATE | TAG STATUS | TEST SUITE | TAG INFORMATION |
|---|---|---|---|
| 2011-02-14 | unverified | TLS server | Openssl 1.0.0 crashes with this test case |
| 2011-02-12 | unverified | TLS server | Openssl 1.0.0 enters a busy loop when running these three test cases in a row |
| 2011-02-12 | | HTTP server | Apache Web server 5.5.2 and most likely any earlier version crashes |
| 2011-02-11 | public | HTTP server | Apache Web server 4.x crashes |
| 2011-02-09 | public | TLS server | Cryptonite TLS server 2.5 leaks memory content to response |
| 2011-02-07 | private | HTTP server | IIS 10.2 starts hogging CPU and memory after this case, until the service is restarted |
| 2011-01-24 | public | Bluetooth | Undisclosed mobile phone reboots with this test case |
| 2011-01-23 | public | Bluetooth | Undisclosed mobile phone does not work with these test cases |
| 2011-01-23 | public | TLS server | Cryptonite TLS server 3.0 crashes |
| 2011-01-16 | public | TLS server | Cryptonite TLS server 3.0 crashes, but only randomly when running this case |

FIG. 3

| Test case # | Duration (ms) | Verdict |
|---|---|---|
| 0 | 25 | pass |
| 1 | 5 | pass |
| 2 | 4 | pass |
| 3 | 3 | pass |
| 4 | 121 | fail |
| 5 | 5 | pass |
| 6 | 3 | pass |
| 7 | 12 | pass |
| 8 | 1560 | fail |
| 9 | 5 | pass |

FIG. 4

NETWORK-BASED TESTING SERVICE AND METHOD OF TESTING IN A NETWORK

TECHNICAL FIELD

The invention is concerned with a network-based testing service and a method for testing in a network.

BACKGROUND

Security vulnerabilities plague modern software. In computer security, vulnerability is a weakness which allows an attacker to gain an unauthorized access to the system or cause a denial of service situation for the legit users. Businesses lose money and reputation when an attack is performed. The prevent this, vulnerabilities should be fixed or mitigated as early as possible.

Vulnerabilities in software are usually caused by programming errors. Also a security risk, however, may be classified as vulnerability and there are vulnerabilities that are not related to software. Hardware, site, and personnel vulnerabilities are examples of vulnerabilities that are not software security bugs.

In security testing, a test case consists of input to a system to be tested, but in contrast to traditional testing, the expected outcome is usually not specified in detail. This is because the purpose of these tests is to locate a security flaw in the system rather than to probe some specific functionality. When a test case is executed, the tested system is subjected to specified inputs and its behavior is then monitored. A test case is considered to be a collection of machine readable and human readable data, which is machine-executable to produce a series of events.

A verdict is given for the test case on the basis of the monitored behavior. The test verdict tells whether a test has succeeded or failed. An identified security problem, such as a denial-of-service, results in a fail verdict. The absence of any unwanted behavior results in a pass verdict. When the number of test cases is large, verdicts must be automatically determined for the test cases. However, once an initial verdict of a test case is known, a problem can be further investigated by looking at the data used to determine the verdict. The test data used can be displayed on a screen. Each data set used for an individual test can consist of the input value of the individual test (a single value or a set of values), the output from the system under test and any additional information which may be collected, e.g. logs produced by the system under test.

Applications can also be tested. Black-box testing is a method of software testing that tests the functionality of an application. Specific knowledge of the application's code/internal structure and programming knowledge in general is not required. Test cases are built around specifications and requirements, i.e., what the application is supposed to do. Any system, which accepts some input can be tested by black-box testing. Black-box testing can be performed by sending messages over a network, but also by injecting files, such as images, XML files, audio files, or any other kind of files. Injection can be done also locally using any methods of input available for an application.

In software testing, fault injection is a technique for improving the coverage of a test by introducing faults to test code paths. Robustness testing (also known as Fuzzing or Fuzz testing) is a type of fault injection commonly used to test for vulnerabilities in communication interfaces such as protocols, command line parameters, or Application Programming Interfaces (APIs).

White-box testing is a method of testing software that tests internal structures or workings of an application. In white-box testing an internal perspective of the system, as well as programming skills, are required and used to design test cases.

Grey-box testing is a combination of these and the tester knows something of the internal structure in order to perform a better test.

A test suite is a collection of related test cases. An executable test suite is a test suite that can be executed by a program. The term System Under test (SUT) refers to a system that is being tested for correct operation. The term is used mostly in software testing.

Through the years, a number of different methods have been proposed for generating test cases. A test case is a description of a test and is traditionally mapped directly to and derived from use cases or be derived from system requirements.

Fuzz testing, or fuzzing, is a software testing technique, often automated or semi-automated, that involves providing invalid, unexpected, or random data to the inputs of a computer program. In fuzzing, unexpected and/or erroneous input data is fed to the tested system. The input data can be generated in random or systematically based on definitions of the allowed input. Typically fuzz testing uses thousands or even millions of different test cases, as it is relatively cheap to produce and run a test case, as expected outcome for a test case is not defined. The difference between an expected input and a fuzz input can be called anomaly, the anomalous input being fed to the tested system. The program is then monitored for exceptions such as crashes or failing built-in code assertions. Fuzzing is commonly used to test for security problems in software or computer systems.

Modern automated security testing technique, like fuzzing, is used to find the vulnerabilities early so that they can be fixed or mitigated before they are used to attack systems. In fuzzing, test cases for security testing are created by understanding which kind of inputs are most likely to reveal vulnerabilities. Test cases are also automatically generated so that the number of test cases is high and the test cases systematically cover the input space. A tester using such a system might find critical vulnerabilities and get them fixed or mitigated.

However, often the tester neither can fix nor mitigate the problem by herself. In such cases, the tester should be able to package and deliver the information about the identified problem and how to replicate the problematic behavior to someone who can fix the problem or mitigate it by other means. There are plenty of stakeholders who would have use of getting such information, such as decision makers, quality and assurance people, network administrators, authorities, etc.

A security testing tool is a program (used by security professionals and professional hackers) that have functionality to test an application and find vulnerabilities and errors. A fuzzer test tool is an example of a security testing tool.

Currently, security testing tools provide human-readable reports which describe the found vulnerabilities. Some systems also allow creating scripts or executables, which should reproduce the vulnerability when they are executed. The reports may be located in the World Wide Web for access without the need to send e-mails etc. with the vulnerability attached.

Vulnerability management programs of identifying, classifying, remediating, and mitigating vulnerabilities exist. Setting up such programs include e.g. determining the desired security state of an environment, defining the current security state, prioritizing possible vulnerabilities, addressing causes of vulnerabilities, and monitoring and maintaining the program as an ongoing process.

Vulnerability information is collected, analyzed and shared with respect to what components are vulnerable to what kind of attacks and exploitations. For this purpose, someone first needs to find and report the problem, before it can be fixed or mitigated. Mitigation may e.g. consist of disabling or reconfiguring the vulnerable service or using a firewall configuration for blocking the attack.

Attempts have been made in categorizing vulnerabilities and ranking the severity of them in information systems but there are no common platforms for reporting and sharing vulnerability information in an efficient way. Current methods of vulnerability reporting are not standardized or suitable for co-operation. Because each producer of vulnerability reports employs a unique document structure that does not facilitate automated processing, users must manually parse individual vulnerability reports to find information that is germane to their environments.

Another problem with vulnerability reports is that it is often difficult or impossible to reproduce the sequence of events leading to the vulnerability announced in the report. Reproduction is usually required to make and test any fix or mitigation. A report may consist of a written description or a script using some scripting language.

A related problem is that a testing tool can generate millions and millions of different test cases. For regression testing of new versions of software, it is often recommended to re-run all test cases to make sure that the new version has no regression, that it has not introduced problems which were not present in the earlier version. Re-running all the test cases that originally were run against earlier versions is, however, often not feasible.

OBJECT OF THE INVENTION

The object of this invention is a system and a method by which a tester could find vulnerability information for test cases in an efficient way.

Another related object is a system and a method by which a tester could easily reproduce the sequence of events leading to an announced vulnerability.

SUMMARY OF THE INVENTION

The invention provides a network-based testing service that is integrated with a tool that publishes one or more tagged test cases with tags being executable to reproduce a sequence of events for a system under test (SUT) caused by an original test case.

The method of the invention is performed in a network and intended for testing software or hardware by first creating an original test case for a system under test (SUT) and performing a sequence of events for the original test case for testing it. The tested case is stored and information of the performed sequence of events is tagged to said tested case. The tagged test case is then sent to a service that publishes tagged test cases. The service publishes the tagged case in a way to be reproduced via the service.

A test case is considered to be a collection of machine readable and human readable data, which is machine-executable to produce a series of events.

Preferably, the tagged test case is stored to be available for many users connected to the network, whereby any user connected to the network can select a tagged test case on the basis of the tagged information, and execute the selected test case by reproducing the sequence of events tagged.

Preferable embodiments of the invention are presented in the subclaims.

A test suite is a collection of related test cases. The service might publish individual tagged test cases or tags made up of from several test cases. Correspondingly, also the method of the invention is performed either for an individual test case or for a collection of test cases.

The testing tool is especially a security testing tool, which runs test cases in order to find flaws. A test case can be a message, a sequence of messages, or a file which when sent to a system under test triggers a flaw in the system. The flaw may be security vulnerability or other kind of problem. The testing tool may be able to create new test cases and/or it may be capable of reading tagged test cases and executing them using the stored machine-readable information.

The invention is thus concerned with a network-based service that is integrated with the tool and which publishes tagged test cases.

A tagged test case is a test case appended with tag information. The tagged test case can be executed to reproduce the sequence of events caused by the original test case. Such a tag may further contain a description of the problem, a link to external information about the problem, attached files, analysis of the result of the test etc.

A tagged test case can contain in machine readable format:

Information about the kind of anomaly or anomalies in the test case. This consists of the unexpected and/or erroneous input which caused the vulnerability or unwanted behavior, such as a crash, a denial-of-service or other reported abnormal behavior Other input data fed to the SUT in the actual test case The syntax of the exchanged messages or files, i.e. of which kind of bytes, bits and/or characters the messages or files are made up of The semantic information about the exchanged messages, i.e. how messages are built up and what kind of messages is exchanged and in which order. This is required to reproduce a tagged test case in dynamic protocols where the actual exchanged bytes are not identical for each test case execution A tag may also specify responses for the test case, which allows a later detection of changes in the behavior of the SUT by running the tagged test case and comparing SUT responses with tagged responses to figure out if the behavior has changed. This allows extending the capabilities of fuzz testing as some fuzzing test cases, which normally do not have an expected outcome defined, now have one. In a later test run, tagged test cases with an expected outcome may be flagged as failures, or at least the user may be asked to check if the new outcome is acceptable.

The tool automatically propagates the test case tags to all users connected to the network, such as stakeholders in real-time. The information can also be categorized so that only relevant information comes to relevant stakeholders/users. It is often desirable that the tester first verifies the test case and thereafter decides whether to publish the test case or not.

Another user of the testing tool may immediately see test cases tagged by others, and she may then view the details of the test case and reproduce it. The tagged case can be directly used to test, fix or mitigate an existing flaw.

In practice, a person who should fix or mitigate the found flaw first notices a tag which is concerned with the product she is maintaining or using. She can then run the tagged test case to see how the product behaves (it might e.g. crash). From the description of the tag it is possible to analyse the test case and find out the root cause for the problem. By means of the information, the product can be fixed of the flaw be mitigated by means of e.g. a firewall rule to protect the product from the triggering input. The tagged test case should then be run again to make sure that the problem is fixed The user may also append the tagged information by her findings and comments. Tight integration between test cases and the testing tool ensures that all test cases are directly executable and the test tool can interpret this tagged test case and perform the test which is described automatically, in contrast to some scripts of prior art which require manual work to be useful.

Further, the tagged test cases form the minimum regression set to be used with newer versions of SUT, as they form the history of flaws SUT has experienced. Especially, if tags now contain the expected outcome from SUT, running the tagged test cases produce information about changes in SUT behavior. On the other hand, the security tool which was used to generate the test cases in the first place, may use the tagged test cases itself to ensure that its efficiency is not diminished as it is ensured that all tagged test cases are still generated by the security tool. This is highly beneficial for users of the tool as now they can be sure that the test cases which they have found useful remain in the tool by tagging the test cases.

When a SUT response is included in a tag, it is possible to observe changes in SUT behavior for tagged test cases. E.g. by tagging test cases which expose some important aspect of SUT behavior, it is possible to later make sure that new versions of SUT behave in the same way by comparing their behavior to the earlier responses saved with the tag. As said, this allows using fuzzing results also for checking SUT responses.

The invention makes it possible for testers to share vulnerability information found during testing in an efficient way and the sequence of events leading to an announced vulnerability can be easily reproduced. The invention also makes it possible to highlight the most useful test cases from millions of different test cases generated by automated test generation tools. The highlighted test cases can be then completed with additional information. Later the highlighted test cases may be executed to ensure proper functionality of later version of tested system.

Thus, the advantages of the invention can be summarized as the ability of the invention of tagging test cases so that they are propagated to multiple users in real-time, the tag being executable and able to reproduce the sequence of events of an original test case. The service is tightly integrated with a testing tool so that the information found immediately and automatically can be used for testing a case. Furthermore, newer versions of a test tool are ensured to find all tagged flaws, since that vulnerability information is documented in the tag in a categorized way. This categorization of that tags can also be used to limit access to them by users.

In the following, the invention is described by means of some preferable embodiments by means of figures. The invention is not restricted to the details of these embodiments.

FIGURES

Figure 2:
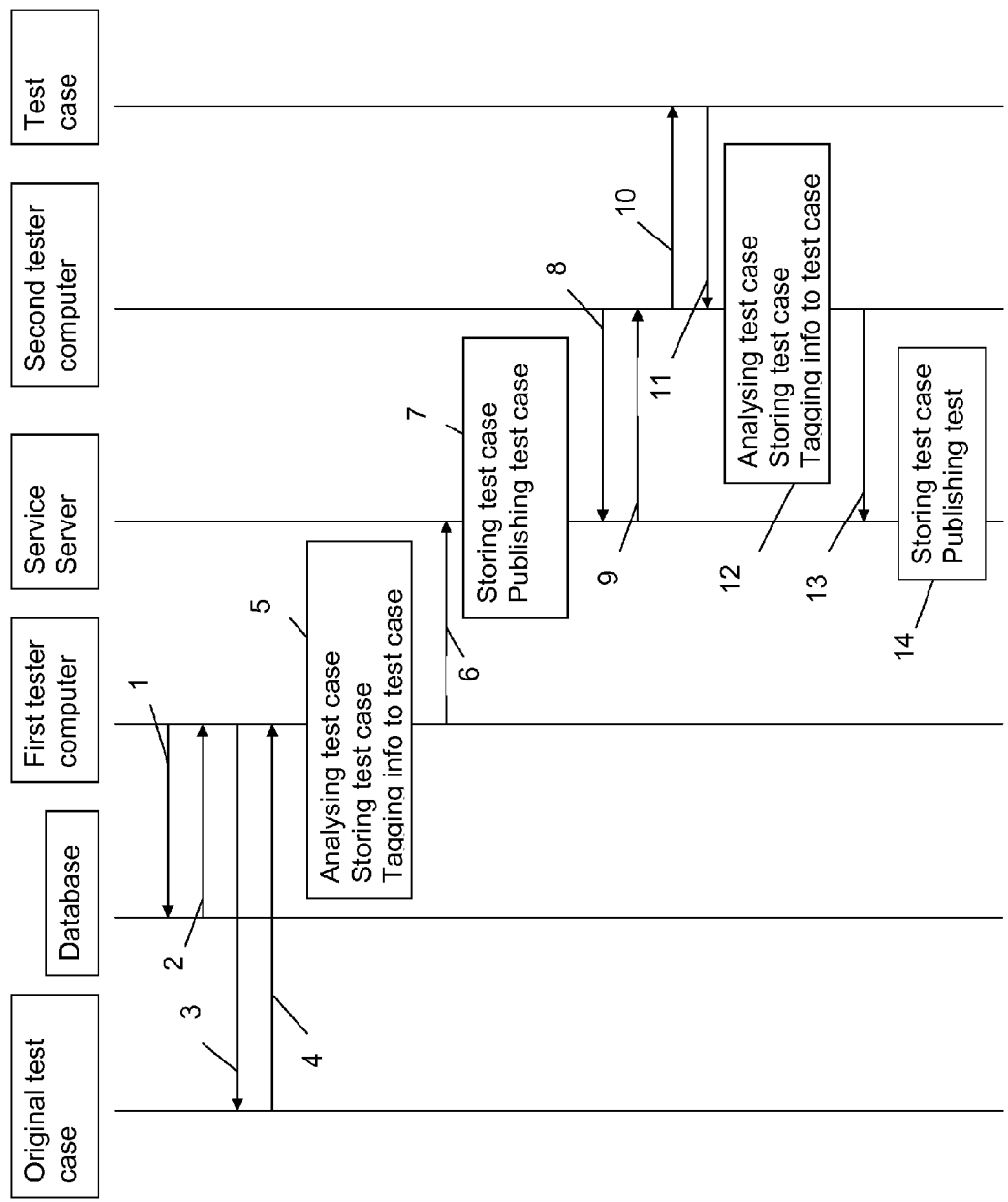

FIG. 1 presents an example of a system in a network environment, wherein the invention can be implemented FIG. 2 presents a signal diagram of the method of the invention FIG. 3 presents an example of a possible user interface of the service of the invention showing tagged test cases FIG. 4 presents an example of a possible user interface of the service of the invention for tagging test cases

DETAILED DESCRIPTION

FIG. 1 presents an example of a system in a network environment, wherein the invention can be implemented. The system comprises tester computers $1a$, $1b$, $1c$ belonging to the network and which has access to a service held by a server 2. The tester computers $1a$, $1b$, $1c$ can access the service of the server 2 through some communication network, e.g. the Internet 3 or within a Local Area Network (LAN).

The computers $1a$, $1b$, $1c$ run software for performing test case processes by calling a data repository $4a$, $4b$, $4c$ and by accessing information for performing a certain test case (or a test suite). The tester computers $1a$, $1b$, $1c$ have means to construct test messages using the information accessed from the data repositories $4a$, $4b$, $4c$ and send the test messages to a system under test $5a$, $5b$, $5c$. The systems under test $5a$, $5b$, $5c$ have means to send response messages back to the respective tester computer $1a$, $1b$, $1c$.

An executed test case can be published in a service held by the server 2 by the user of the tester computer $1a$, $1b$, $1c$ since the service is integrated with a tool that is capable of publishing test cases with tags. Therefore, the tester computers $1a$, $1b$, $1c$ use means to send the information of performed test cases to the server 2. The tags are executable to reproduce a sequence of events caused by the original test case to which the tags were attached.

Additional information about the executed test case can be connected to the tagged published test case. Such information can e.g. consist of the exact setting or instructions of the software run tested that caused a fault. The test case can consist of e.g. a sequence of test messages, a file, e.g. an image file, XML file, audio file, or the like.

The security testing tool integrated with the service may publish the received and tagged test cases on e.g. a server connected to Internet or to a local area network by means of said service held by the server.

The security testing tool can be any executable tool for performing a test case, like a fuzzer tool or other tool used in black-box testing, white box testing or grey-box testing. The invention is, however, primarily meant to be used by using fuzzer or black-box testing tools.

The computers $1a$, $1b$, $1c$ run software for performing test cases selected from the service, wherein such test cases are listed up, by calling said service and construct test messages or files etc. for these reproducible test cases. Information in the service can be accessed by means of the tool integrated with the service in the form of said executed and reproducible test cases with the tagged information and by means of which a selected test case automatically can be performed.

A test case can be run by selecting it by clicking on it in the user interface if a SUT is installed for a user who intends to run tests by using the service of the invention. Different users might have different systems under test, like different versions of SUT or different products which implement the same functionality, etc. To run a test and to connect a system to be tested to the service, the user has to define where and/or what the system to be tested is, e.g. by means of an IP address, a Bluetooth address, versions of SUT or different products which implement the same functionality, an application name or the like. Once a SUT is identified, tagged test cases can be executed.

When a tester computer 1a, 1b, 1c has completed such a test case, more information can, if desired, be added in addition to the earlier tagged information.

The messaging in the network between the tester computers 1a, 1b, 1c, the server 2 and the systems under test 3a, 3b, 3c may use any suitable wireless or wired networking means, e.g. the Ethernet network, Wireless Local Area Network (WLAN), Internet connection, and/or Bluetooth connection, or any other networking technique.

FIG. 2 presents a signal diagram to illustrate the method of the invention.

First a test case instance is created for an original test case for a system under test (SUT) and completed which is indicated by signals 1-4 in FIG. 2.

The creation of the original test case for a system under test (SUT) consists of using information fetched by signals 1-2 from a data repository. This information may comprise a machine-executable description of the test case, a human readable description of the tested protocol message, elements, and/or fields, a human readable description of the input data and anomalies. Thereafter the tester computer communicates with the original system under test for performing the test execution in signals 3-4 (there might be more communication but for clarity only signals 3-4 are mentioned here).

Once the test case instance is completed and executed it can be analyzed and stored in the tester computer in step 5 and also information about the result can be attached (tagged) to the stored test case instance and other information. The stored and tagged test case can then be sent in signal 6 to the service held by the service computer in order to be stored and published in step 7 in order to be available for other tester computers (and also for this tester computer).

The tagged test case is stored in the same way together with other executed test cases listed up in the service and sent thereto by the same tester computer or by other tester computers and having tagged information therein. The signals for these are not shown in FIG. 2 but are analogous to signals and steps 1-7.

Any tester computer (the same tester computer or other tester computers) connected to the service that has access to the service can view the list of tagged test cases and select a test case for testing on the basis of the tagged information in connection with a certain test case. This is indicated with signals 8 and 9 in FIG. 2. After the selection of a test case, the tester can run a testing for the selected test case, which is indicated with signals 10 and 11 in FIG. 2.

A tester using the tester computer can connect additional information after the test execution to the test case and store it in the tester computer in step 12 and then send it with signal 13 for storing and publishing by the service, which is indicated in step 14.

In this way, all users of the service gets real time information of recently executed test cases and can specify test case selection criteria on the basis of that.

A possible result of a test run is that the user can see on the screen of the testing computer that a certain test case has got a fail verdict as it seems to crash the SUT. The user then tags the test case that gave the fail verdict with information of test data used in the test. It is, however, highly recommendable that the result of the test run should be verified before publishing. A re-run of the test is therefore performed in order to verify crash of the SUT by using the same test data as in the first test. The user publishes the tag if the crash was verified by the performed re-running of the test case. Generally, by using tag information, the verdict maybe changed depending on whether the investigation revealed a security flaw in the system under test or not.

The user also enters information (in addition to test data used) about the behavior of SUT in case of executing it as a part of the tagged information.

In one embodiment of the invention, said re-running of test cases can be automated in different ways. The above steps 3-4 of FIG. 2 can be programmed to take place automatically when a crash is detected. In addition, steps 3-4 could be automated so that all failed test cases are automatically run again to check if the flaw can be reproduced. In some embodiments, also step 5 can be automated so that all verified test cases are tagged and published with tags automatically.

It is possible to design the system so that a user only sees tags that are relevant for systems they are working with. When observing a new tag, a user can click the tag to see the full tag description. In one embodiment, selecting a tag, by e.g. double-clicking the tag, results in a run of the tagged test case. In this way the user can check if or verify that the crash takes place for her system, too with the same test data. Depending on the result (verdict), the user can add a comment to the tag whether her system also resulted in the same fail, e.g. crashed or not.

It may be beneficial to have a way to find out if a tagged test case matches some other test case. For example, to show the tags attached to a test case from all test cases in a test suite. Furthermore, if it is desired to make sure that the test case generator always produces all tagged test cases, which is one goal of the tagging in the invention, there must be a way to check if all tagged test cases are indeed generated. Still further, would a user tag a test case which is already tagged, she should be notified and asked if she actually would like to edit the existing tag rather than to create a new one. All the aforementioned functionalities need a way to identify if a test case is already tagged by one or several of the existing tags.

Test cases in a test suite are indexed, and the index could serve as a way to identify a test case. However, indices are likely to change when new kind of test cases are introduced to a test suite. One could also compare the machine-readable description of a test case and tagged test case to see if they would give the same result upon execution. However, this would probably be quite slow for millions of test cases and also a different machine-readable instruction could lead into identical input and thus to the same result for the test case when running the test.

However, calculating a message digest, or a hash code, over the input data of a test case provides a quick way to find out which test cases have identical inputs and thus are effectively the same test case. By storing or calculating the hash code from the tagged test case, or test cases, and from test cases of a suite, one can quickly find out which test cases match to the tagged test cases.

Additional identification of the tagged test case may be provided e.g. by a test group of the case. A test group is some logical group to which a test case belong, e.g. by the location of the anomaly or by the type of the anomaly in the test case.

FIG. 3 presents an example of a part of a possible Graphical User Interface (GUI) of the service of the invention showing a table for tagged test cases. From the GUI, a user can select a tag and its detailed information by clicking on a table row. Once a tag is selected, there are buttons etc. to execute the tagged test case, and/or edit tags, publish edited tags and delete tags. The buttons are not shown in FIG. 3 as there are different ways to design the lay-out of the user interface. Tag updates can periodically be updated to the table and there may also be a button for immediate update.

FIG. 3 shows ten tagged test cases originating from three different test suites. Naturally, there are usually more of them in practice but only ten are shown of clarity reasons. The first column shows when the tag was created. The second column shows the status of the tag: Already published tags have the status "public". Tags which are just created, but the described behavior is not verified have the status "unverified". Tags which are verified, but are not published are "private". The third column shows the test suite and that five tags have been created for the Transport Layer Server (TLS) suite, three for the HyperText Transfer Protocol (HTTP) server suite, and two for the Bluetooth test suite. The last column shows the information written by the user for the tag.

The service GUI can list up the test suites in an alphabetical order or in a chronological order or categorized in another way. The GUI could also e.g. show a table with all systems under test defined for a current project. In FIG. 3, tags are listed up in a chronological order, when they are created The third column shows a part of the tag information for each executed test suite. Additional tagged information might e.g. be found by clicking on the test suite of interest under this column.

The service tool allows systems under test to be selected and a number of actions to be carried out by double clicking on the selected test suite under the third column.

FIG. 4 shows an illustrator of a GUI for tagging test cases. Tagging is preferably done in a view, which summaries results of a test run made using a test suite. The GUI shows a list of executed test cases with table columns: Index of the test case, duration of the test case in the test run and a verdict assigned for the test case. FIG. 4 shows that two test cases, #4 and #8, failed while the other ones were considered a pass verdict. FIG. 4 is just an illustration. In reality a test run can be made up of thousands or millions of test cases. Furthermore, additional information may be shown for the test cases, such as the kind of anomaly, the response from the SUT, possible existing tags for the test case, etc.

The user can create a tag by clicking on a test case, or test cases, e.g. she could click on a table row with test case #4 to tag the test case #4. After that a window would open up for the user to enter tag information, such as an analysis of the fail that she has discovered. She could also attach additional files, such as SUT logs or crash dump files, with the tag. After having completed this, clicking "OK" or on such button would create the tag.

EXAMPLE

An example of a very simple tagged test case for a HTTP server testing may be made up from the following input data
GET/HTTP/1.1\r\n
Host: aaaaaaaaaaaaaaaaaaaaaaaaa\r\n
User-Agent: HTTP Test Suite\r\n
Connection: keep-alive\r\n
Date: Fri•Dec•2•20:11:22•2011
\r\n The above input data makes up a request message which is sent to a HTTP server, when this test case is executed. This message is sent over a Transmission Control Protocol (TCP) socket connected to the HTTP server.

The input data of the test case thus consists of the message, which is shown above. The tag contains the information that this test case is for testing HTTP servers, which means that the test tool knows to use the TCP socket to send the data once the HTTP server address is specified.

The test case contains the anomaly, which is the string of 25 letters "a" as the value for the HTTP header "Host:".

Semantic information attached to the test case could e.g. be that a formatted current date must be placed into the "Date" HTTP header, rather than to use the date which goes with the test case input data. The type of semantic information for test cases vary greatly depending on the type of the test suite from which the test case comes from.

The tag information for this test case could e.g. contain the following:
This is for http server testing
The tagging time and date
Test case identification (identification made e.g. by index in the original suite and by a hash code
Information which further identifies where an anomaly is located is located in the protocol
The name of the tester, maybe with contact information such as e-mail address
Useful external resources, e.g. a reference to the HTTP specification, which describes what a HTTP header should look like
A free text description, e.g. "This test case caused denial-of-service in our Internal HTTP server, version number 10.2.12build12".

The invention claimed is:

1. A network-based testing service in a network environment (3) comprising:
a server (2), executing instruction code recorded on a data storage device in communication with the server (2); and
a tester computer, which has access to a service provided by the server (2) in communication with the test computer, and which runs software, recorded on a data storage device of the tester computer, that upon execution by the tester computer performs test case processes, the software configured to cause the tester computer
to fetch one or more tested cases,
to automatically tag a test case causing abnormal behavior in a system under test with information on a performed sequence of events for the test case, and
to transmit the tagged test case to the server, wherein the server is configured to publish the tagged test case with tags being selectable to execute the test case by an other tester computer in communication with the server (2), the other tester computer automatically reproducing the sequence of events for a different system under test.

2. The testing service of claim 1, wherein a tag of a tagged test case presents information of the exact setting or instructions of the system under test that were used in the test case.

3. The testing service of claim 2, wherein a tag of said tagged test case presents additional information to the test case, such as results of the executed test case and other information.

4. The testing service of claim 2, wherein a tag of said tagged test case further presents information of the kind of anomaly or anomalies in the test case, other input data fed to the system under test in the actual test case, the syntax of the exchanged messages or files, and/or the semantic information about the exchanged messages.

5. The testing service of claim 2, wherein a tag of said tagged test case further presents identification information of the test case, the identification consisting of an index, a hash code or a message digest calculated over input data of the test case, and/or a test group specifying the location of an anomaly in the test case.

6. The testing service of claim 2, wherein a tag further specifies the expected response for the test case.

7. The testing service of claim 2, wherein a tag of said tagged test case further contains a description of a problem found by the test case, a link to external information about the problem, and/or attached files.

8. The testing service of claim 1, wherein the test case performed for a system under test, is either of a sequence of test messages or a file.

9. The testing service of claim 1, wherein it is shared by connected users.

10. The testing service of claim 1, wherein the tagged test cases are categorized on the basis of tagged information, on the basis of the type of system under test, on the basis of a connected project, on the basis of the date of storing or performing the test or in an alphabetical order.

11. The testing service of claim 1, wherein the tagged test cases are selectively published for connected users on the basis of category.

12. A method of testing in a network (3), carried out by a tester computer and a server (2) connected thereto, the tester computer being in communication with a service operated by the server (2) and having software recorded on a data storage device of the tester computer that, upon execution by the tester computer, performs test case processes, the method comprising at least the following steps:
  a) at the tester computer, creating an original test case for an original system under test,
  b) at the tester computer, performing a sequence of events for the original test case by communicating with the original system under test, and generating a tested case including information of the performed sequence of events and information associated with abnormal behavior in the original system under test,
  c) at the tester computer, storing the tested case and automatically tagging the information of the performed sequence of events of said tested case being associated with the abnormal behavior,
  d) at the tester computer, sending the tagged test case to the server (2) that operates the service, the service configured to publish tagged test cases, and
  e) at the server, publishing the tagged case, the tagged test being selected and automatically executed by an other tester computer in communication with the server (2), and at the other test computer, automatically reproducing the sequence of events of the tagged test for a different system under test.

13. The method of testing claimed in claim 12, wherein in step e) the tagged test case is stored to be available for one or more users connected to the network (3).

14. The method of testing claimed in claim 13, further comprising:
  f) selecting, by a user connected to the network (3), a tagged test case,
  g) executing the selected test case by reproducing the sequence of events tagged.

15. The method of testing claimed in claim 12, further comprising:
  automatically publishing the tagged test cases to connected users sharing the information of the service.

16. The method of testing claimed in claim 12, wherein the test case comprises either of a sequence of test messages or a file.

17. The method of testing claimed in claim 12, further comprising:
  tagging in step c) information of the exact setting or instructions of the software run tested that caused the fault.

18. The method of testing claimed in claim 17, further comprising:
  tagging in step c) additional information to the test case, such as results of the executed events and other information.

19. The method of testing claimed in claim 17, further comprising:
  tagging in step c) additional information to the test case of the kind of anomaly or anomalies in the test case, other input data fed to the system under test in an actual test case, the syntax of the exchanged messages or files, and/or the semantic information about the exchanged messages.

20. The method of testing claimed in claim 17, further comprising:
  tagging in step c) additional information to the test case identifying the test case by means of an index, by means of a hash code or a message digest calculated over input data of a test case and/or by means of a test group specifying the location of an anomaly in the test case.

21. The method of testing claimed in claim 17, further comprising:
  tagging in step c) additional information to the test case specifying responses for a test case.

22. The method of testing claimed in claim 17, further comprising:
  h) detecting the behavior of the system under test for the executed and selected test case,
  i) comparing the detected behavior of the system under test to the tagged specified response, and
  j) detecting a possible change in the behavior.

23. The method of testing claimed in claim 12, further comprising:
  categorizing the tagged test cases on the basis of the tagged information in accordance with the type of system under test, a connected project, or the date of storing or performing the test or in an alphabetical order.

24. The method of testing claimed in claim 12, further comprising:
  selectively publishing the tagged test cases to relevant users sharing the information of the service on the basis of the categorized tag information.

25. The method of testing claimed in claim 12, further comprising:
  correcting or mitigating a flaw in a tested case by means of a selected tagged case.

* * * * *